United States Patent [19]

van der Lely

[11] 4,127,175
[45] Nov. 28, 1978

[54] SOIL CULTIVATING IMPLEMENTS

[76] Inventor: Cornelis van der Lely, 7, Brüschenrain, Zug, Switzerland

[21] Appl. No.: 740,202

[22] Filed: Nov. 9, 1976

[30] Foreign Application Priority Data

Nov. 12, 1975 [NL] Netherlands .................... 7513213

[51] Int. Cl.² .................... A01B 33/06; A01B 27/00
[52] U.S. Cl. .................... 172/50; 172/59; 172/40
[58] Field of Search .................... 172/48, 50, 53, 54, 172/59, 94, 84, 88, 51, 63, 119, 123, 101, 89, 87, 97, 40

[56] References Cited

U.S. PATENT DOCUMENTS

| 155,975 | 10/1874 | Redfield | 172/766 X |
|---|---|---|---|
| 396,441 | 1/1889 | Taylor | 172/48 |
| 1,268,992 | 6/1918 | Norby | 172/84 |
| 1,458,655 | 6/1923 | Jahn | 172/63 |
| 2,061,694 | 11/1936 | Cuddigan | 172/526 |
| 3,504,598 | 4/1970 | Haker | 172/40 |
| 3,774,689 | 11/1973 | Lely | 172/59 |
| 3,945,441 | 3/1976 | Lely | 172/51 |

Primary Examiner—Richard J. Johnson
Attorney, Agent, or Firm—Mason, Mason & Albright

[57] ABSTRACT

A cultivating implement includes a row of cultivating members, such as resilient tines or tined rotors, and a soil crumbling member positioned at the rear of the cultivating tines. A driving transmission, including eccentric weights or discs, is interconnected to supports which mount elongated, horizontally extending elements of the crumbling member and the elements are moved relative to the frame in a non-horizontal direction to perform reciprocatory and/or vibratory movements against the soil previously worked by the tines. The supports are pivoted to the frame either by forwardly extending arms or by flexible brackets which, in effect, pivot when acted on by the eccentric transmission.

13 Claims, 8 Drawing Figures

SOIL CULTIVATING IMPLEMENTS

According to one aspect of the invention, there is provided a soil cultivating implement, wherein a plurality of elongated and substantially horizontally extending cultivating elements are provided which together wholly or principally afford at least one soil crumbling member, and wherein a drive transmission for the cultivating elements is also provided which, when in operation, will cause those elements to perform reciprocatory/vibratory movements in a non-horizontal direction.

For a better understanding of the invention, and to show how the same may be carried into effect, reference will now be made, by way of example, to the accompanying drawings, in which.

Figure 1:
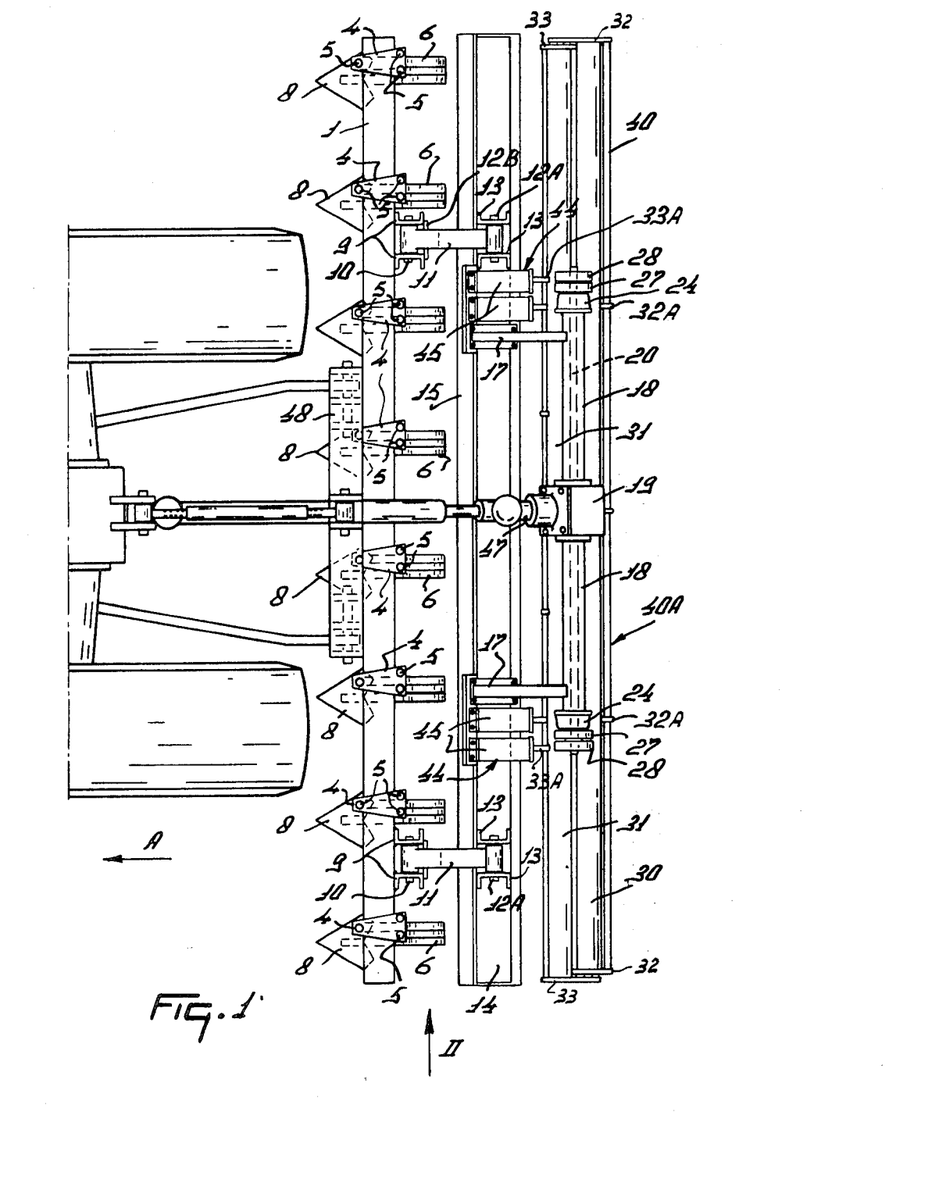
FIG. 1 is a plan view of a soil cultivating implement in accordance with the invention connected to the rear of an agricultural tractor.
Figure 2:
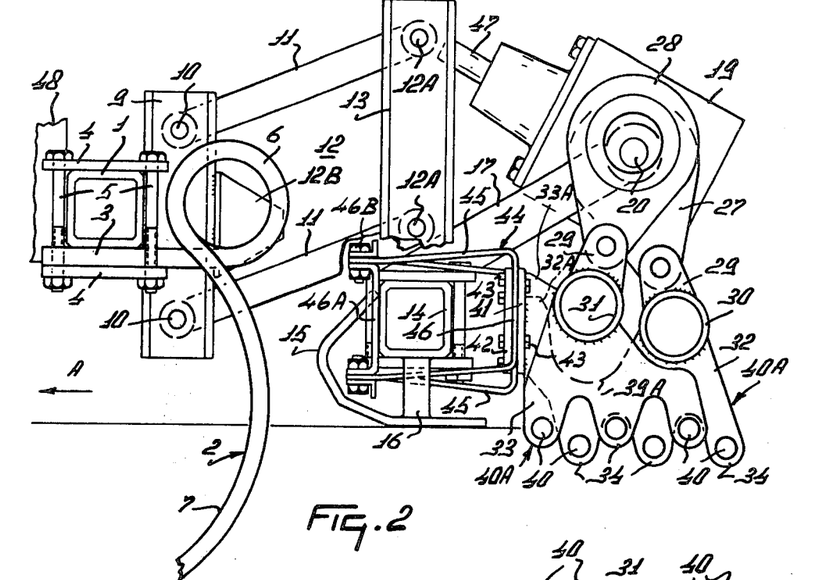
FIG. 2 is a side elevation, to an enlarged scale of the implement of FIG. 1 as seen in the direction indicated by an arrow II in that FIG.
Figure 3:
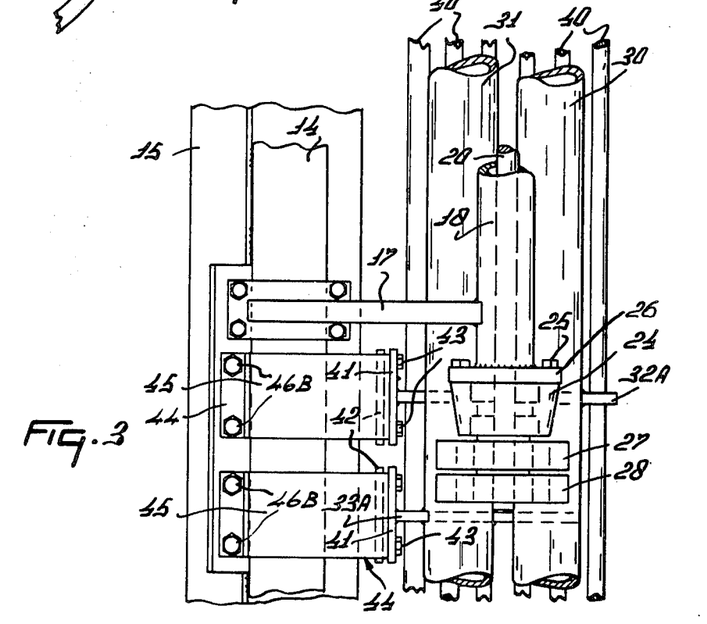
FIG. 3 is a plan view, to a further enlarged scale, showing the construction and arrangement of some parts of the implement in greater detail.

Referring to FIGS. 1 to 3 of the accompanying drawings, the soil cultivating implement that is illustrated therein comprises a frame beam 1 that extends substantially horizontally transverse, and usually substantially horizontally perpendicular (as illustrated), to the intended direction of operative travel of the implement that is indicated by an arrow A in FIGS. 1 and 2 of the drawings and similarly in other Figures of the drawings for other embodiments that will be described below. It can be seen from FIG. 2 of the drawings that the frame beam 1 is of hollow formation and substantially square cross-section and is arranged so that at least one external surface thereof (the lowermost) is substantially horizontally disposed. While it is preferred that the beam 1 should have a substantially square cross-section, this is not absolutely essential and some other regular or irregular polygonal cross-section may be used, if preferred, provided only that at least one outer surface of the beam 1 is substantially horizontally disposed. The beam 1 is provided at regular intervals along its length with cultivator tines 2 which total eight in number in the example that is illustrated in FIGS. 1 to 3 of the drawings. Each cultivator tine 2 comprises a substantially rectilinear fastening portion 3 that is arranged immediately beneath the lower surface of the frame beam 1 so as to extend parallel or substantially parallel to the direction A. Each fastening portion 3 is clamped firmly but releasably against the lower surface of the beam 1 by upper and lower clamping plates 4 that are of substantially trapezoidal configuration and co-operating groups of three substantially vertically disposed bolts 5. The rearmost end of each tine fastening portion 3 merges integrally into a coil 6 that comprises substantially three complete 360° turns and the end of the coil 6 that is remote from the fastening portion 3 merges into a soil working portion 7 of curved configuration. Substantially the whole of each coil 6 is located at a higher horizontal level than is the bottom of the corresponding fastening portion 3 and each soil working portion 7 is initially inclined downwardly and rearwardly with respect to the direction A at its upper end but is then curved forwardly so that, at its lower end, it is directed forwardly relative to the direction A. The lowermost leading end of each soil working portion 7 is provided with a replaceable blade 8 of goosefoot shape. Apart from the blade 8, the whole of the remainder of each cultivator tine 2 is formed from a single lenght of resilient material, advantageously spring steel, that is of square cross-section. With this square cross-section, the fastening portions 3 can be secured in their appointed positions by the clamping plates 4 in a very effective manner but, if desired, some other regular polygonal cross-section having an even number of sides may be used as an alternative.

Two pairs of support beams 9 are welded or otherwise rigidly secured to the rear of the frame beam 1 at two locations which are spaced inwardly by equal distances from the opposite ends of the frame beam 1. The support beams 9 are thus disposed in substantially vertical, or at least upwardly extending, positions and it can be seen in FIG. 1 that the two beams 9 of each pair are spaced apart from one another lengthwise along the frame beam 1 by a short distance. Parallel upper and lower pivot pins 10 are arranged between the two support beams 9 of each pair, said pins 10 extending parallel to the main frame beam 1 and thus perpendicular, or at least transverse, to the direction A. The leading ends of upper and lower pairs of arms 11 are arranged turnably around the pivot pins 10 between the two support beams 9 of each pair, said arms 11 forming parts of parallelogram linkages 12 by which a beam 14 is indirectly coupled to the frame beam 1. The rearmost ends of the arms 11 are turnably connected to substantially vertical, or at least upwardly extending, pairs of support beams 13 by upper and lower pivot pins 12A that are parallel to the pivot pins 10, the lower ends of the two support beams 13 of each pair being rigidly secured to the top of the beam 14. The Beam 14 extends parallel to the main frame beam 1, is of the same length as that beam and has its opposite ends in register with the opposite ends of the beam 1 as seen in plan view (FIG. 1) with respect to the direction A. As illustrated, the beam 14 is preferably of identical constructiion to the beam 1 being hollow and of substantially square cross-section with its opposite upper and lower outer surfaces substantially horizontally disposed. However, the beam 4 may be of some other construction if so desired. The beam 14 is supported from the ground surface by a shoe 15 that extends throughout the transverse length of the beam 14, said shoe 15 having the cross-sectional shape that can be seen in FIG. 2 of the drawings. This shape is such that the uppermost edge of the shoe is located immediately in front of the beam 14, close to the top of that beam, from whence it extends forwardly and downwardly to be bent over downwardly and rearwardly at substantially the same level as the bottom of the beam 14. Further bends cause the shoe 15 to extend less pronounced downwards and more pronouncedly rearwards until a final horizontal or substantially horizontal portion is formed whose lowermost surface will bear against the ground during the operation of the implement and whose rearmost free edge is located behind the back of the beam 14 with respect to the direction A and as seen in plan view (FIGS. 1 and 3). A number of upright brackets 16 connect the upper surface of the substantially horizontal portion of the shoe 15 to the lower surface of the bottom of the beam 14 which is disposed vertically above said portion of the shoe 15. Although it is preferred that the shoe 15 should extend throughout the transverse length of the beam 14, this is not absolutely essential and it may, if desired, have a lesser transverse length than does the beam 14.

The top of the beam 17 has the lower ends of two upwardly and rearwardly inclined supports 17 rigidly, but releasably, secured to it by clamping plates and co-operating bolts at two locations that are spaced by equal distances from the midpoint of the beam 14, said locations both being disposed nearer to the midpoint of the beam 14 than are the two parallelogram linkages 12. The upper rear ends of the two supports 17 are rigidly secured to corresponding portions of a tubular casing 18 which is of circular or substantially circular cross-section and that extends substantially parallel to the beams 1 and 14 and thus perpendicular or substantially perpendicular to the direction A. The two coaxial portions of the tubular casing 18 are interconnected at their adjacent ends by an intervening gear box 19 and the ends of said portions that are remote from the gear box 19 are located outwardly beyond the points at which those portions are fastened to the corresponding supports 17. A substantially horizontal shaft 20 extends coaxially through the two portions of the tubular casing 18 and through the intervening gear box 19, the opposite free ends of the casing 18 being provided with bearing housings 24 which accommodate substantially horizontal bearings rotatably supporting the shaft 20. The opposite ends of the casing 18 are formed with perpendicular flanges 26 and the housings 24 are releasably secured to those flanges 26 by bolts 25.

Immediately beyond each bearing housing 24, the end of the shaft 20 has two eccentrics 27 and 28 connected to it in very closely neighbouring relationship. Each of the two eccentrics 28 and 28 comprises a disc that is eccentrically secured to the shaft 20 so as to be rotatable therewith and a ring whose inner surface rotatably surrounds the disc, said ring comprising an integral lug. The two discs of the two eccentrics 27 and 28 at each end of the shaft 20 are secured to that shaft in such a way as to be substantially 180° out of phase with one another. The lugs that integrally form parts of the rings of the eccentrics 27 and 28 are pivotally connected to further lugs 29 located substantially at the top of corresponding tubular supports 30 and 31, said supports 30 and 31 being substantially parallel to the casing 18 and to the beams 1 and 14 and being of substantially, although not necessarily exactly, the same length as said beams 1 and 14. The tubular support 31 is in advance of the tubular support 30 with respect to the direction A and is at substantially the same horizontal level although it will be realised from the following description that said tubular supports 30 and 31 move upwardly and downwardly relative to one another substantially constantly during the use of the implement. Each of the two tubular supports 30 and 31 is provided at its opposite ends and at intervals along its length with corresponding substantially vertically disposed support plates 32, 32A and 33, 33A respectively, each support plate being disposed with its general plane substantially parallel to the direction A and the support plates 32 and 33 that are at the ends of the tubular supports 30 and 31 being located in close proximity to one another (see FIG. 1). The lower edge of each of the support plates 32, 32A, 33 and 33A is formed with three downward projections 34 that are spaced apart from one another by equal distances in the direction A. Owing to the spacing of the tubular supports 30 and 31 in the direction A, the projections 34 that correspond to the plates 33 and 33A are arranged alternately between the projections 34 that correspond to the support plates 32 and 32A with respect to the direction A. The projections 34 are interconnected by elongated elements 40 in the form of rods of circular cross-section, said elements 40 extending parallel to the tubular supports 30 and 31 and to the beams 1 and 14 and thus perpendicular or substantially perpendicular to the direction A. As seen in plan view (FIG. 3), the elements 40 that correspond to the support plates 32 and 32A are arranged alternately in regularly spaced apart relationship relative to the elements 40 that correspond to the support plates 33 and 33A.

Each of the support plates 32 and 32A that is secured to the rear tubular support 30 has its upper edge formed with a downward recess 39A at a location in front of the tubular support 30 relative to the direction A and it will be seen from FIG. 2 of the drawings that the recesses 39A accommodate the tubular support 31 in such a way that the latter support can move upwardly and downwardly in the recess 39A. The fronts of the four support plates 32A and 33A with respect to the direction A are provided with substantially vertical plates 41 whose general planes are substantially perpendicular to the direction of travel A. The plates 41 are secured by clamps 42 and bolts 43 to the upright bases 46 of channel-shaped resilient brackets 44 which are conveniently formed from spring steel sheet. Upper and lower substantially parallel limbs 45 of the brackets 44 project more or less horizontally forwardly from the bases 46 thereof and their free ends are fastened to the upper and lower limbs of supports 46A by upper and lower bolts 46B, the arrangement being such that the limbs 45 provide a resilient connection between the beam 14, to which the supports 46A are secured, and the four support plates 32A and 33A.

Bevel pinions (not visible) inside the gear box 19 place the shaft 20 in driven connection with a rotary input shaft 47 of said gear box whose leading splined or otherwise keyed end projects forwardly and upwardly from the front of the gear box (see FIG. 2). As illustrated in outline in FIG. 1 of the drawings, the input shaft 47 of the gear box 19 is intended to be placed in driven connection with the power take-off shaft at the rear of an agricultural tractor or other operating vehicle by way of an intermediate telescopic transmission shaft of a kind that is known per se having universal joints at its opposite ends. The front of the frame beam 1 is provided, midway across the width of the implement, with a coupling member or trestle 48 that is of generally triangular configuration when seen in front or rear elevation. The coupling member or trestle 48 is arranged for connection to the three-point lifting device or hitch of an aricultural tractor or other operating vehicle in the generally known manner which can be seen in outline in FIG. 1.

In the use of the soil cultivating implement that has been described with reference to FIGS. 1 to 3 of the drawings its coupling member or trestle 48 is connected to the lifting links of the three-point lifting device of an agricultural tractor or other operating vehicle and the input shaft 47 of the gear box 19 is placed in driven connection with the power take-off shaft of the same tractor or other vehicle by way of the above mentioned known intermediate telescopic transmission shaft having universal joints at its opposite ends. FIG. 2 of the drawings illustrates the implement in operation and it will be seen that the resilient cultivator times 2 are dragged forwardly through the earth in the direction A and will break up that earth down to a predetermined depth. The beam 14, which is connected to the beam 1 via the parallelogram linkages 12, is sustained from the ground surface by the shoe 15 and travels over that ground surface at a substantially constant level thereabove. Changes in the working depth of the portions 7 of the cultivator tines 2 are brought about by setting the lifting links of the three-point lifting device or hitch of the agricultural tractor or other operating vehicle at a higher, or lower, level as may be required. The beam 14 can, of course, move upwardly and downwardly relative to the beam 1 to match undulations in the surface of the soil which is being worked by the implement. When the implement is to be transported from one place to another without performing any working operation, it is raised clear of contact with the group by the three-point lifting device or hitch of the agricultural tractor or other operating vehicle to which it is connected and, at such times, excessive downward displacement of the beam 14 and the parts which it carries relative to the beam 1 is prevented by stops 12B that lie in the path of downward movement of the upper arms 11 of the two parallelogram linkages 12 about the upper pivot pins 10. The shaft 20 is rotated by the drive that is transmitted to it from the power take-off shaft of the agricultural tractor or other operating vehicle through the gear box 19 and the two discs of each pair of eccentrics 27 and 28, that are 180° out of phase with one another, revolve and cause the surrounding rings to follow circular paths that are centered upon the axis of rotation of the shaft 20. These movements are transmitted to the tubular supports 30 and 31 and the support plates and elongated elements which those tubular supports 30 and 31 carry so that said parts are caused to reciprocate upwardly and downwardly at a rapid rate which is such that their motion can be considered as being vibratory. It will be appreciated that, while the elements 40 corresponding to the support plates 32 and 32A are moving upwardly, the elements 40 that correspond to the support plates 33 and 33A will be moving downwardly and vice versa, upward and downward movement of the tubular support 31 and its plates 33 and 33A being possible by virtue of the provision of the downward recesses 39A. The soil that is broken up by the cultivator tines 2 is subsequently levelled to some extent by the shoe 15 after which it is intensively crumbled and further levelled by the two groups of elongate elements 40, which afford soil working elements or members, said groups of elements 40 moving rapidly upwardly and downwardly inrelatively opposite directions at any given instant except for the moments when said elements 40 are at rest, these moments coinciding with the reversals of direction of upward and downward movement. As seen in plan view (FIG. 3), the elements 40 that are alternately disposed in the two separate groups thereof are advantageously spaced apart from one another in the direction A by distances of substantially 3 centimeters. The implement is usually able to produce a substantially level, well crumbled and homogeneous seed bed in a single traverse of the soil. The resilient connection of the four support plates 32A and 33A to the beam 14 by way of the brackets 44 intensifies the vibratory effect of the two groups of elongated elements 40 that are driven to move upwardly and downwardly by the opposed eccentrics 27 and 28 respectively. Each group of three elongate elements 40 and the corresponding support plates 32, 32A and 33, 33A forms a soil crumbling member that is generally indicated by the reference 40A. The soil crumbling members 40A will function effectively even on heavy and/or wet oil breaking up the coarse lumps of earth that are produced by the cultivator tines 2 along natural fracture lines as a result of the rapid and intensive upward and downward vibratory motion thereof that is produced during the operation of the implement.

Figure 4:
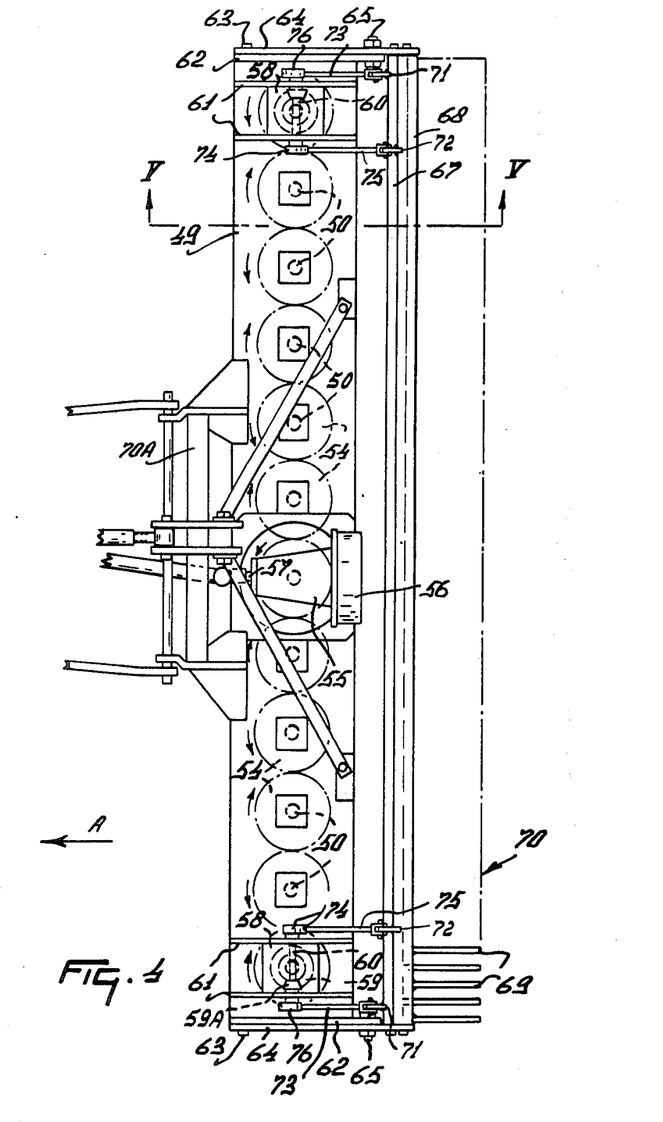
FIG. 4 is a plan view illustrating an alternative soil cultivating implement in accordance with the invention connected to the rear of an agricultural tractor.
Figure 5:
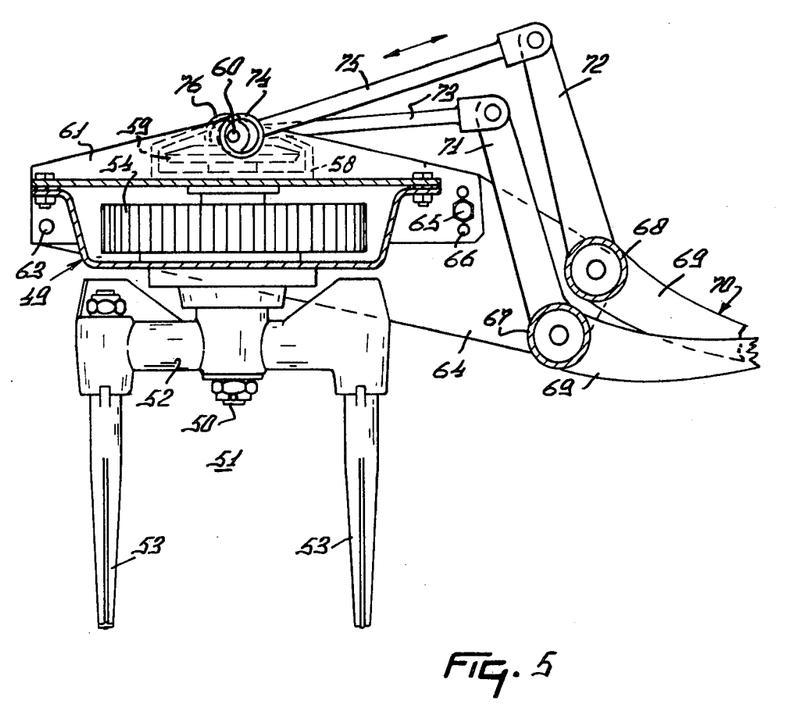
FIG. 5 is a section, to an enlarged scale, taken on the line V—V- in FIG. 4.

The soil cultivating implement that is illustrated in FIGS. 4 and 5 of the drawings comprises a hollow box-shaped frame portion 49 which extends substantially horizontally transverse, and usually substantially horizontally perpendicular (as illustrated), to the intended direction of operative travel A of the implement. A plurality of substantially vertical, or at least upwardly extending, shafts 50 are rotatably mounted in bearings supported by the upper and lower walls of the frame portion 49, the axes of rotation of the single row of shafts 50 advantageously being spaced apart from one another by distances of substantially 25 centimeters and there being a total of twelve of the shafts 50 in the embodiment that is being described by way of example. However, it is noted that there could be more or less of the shafts 50 and that their relative spacing could have some value other than the figure which has just been mentioned. The lowermost end of each shaft 50 projects from beneath the bottom of the frame portion 49 and there has a corresponding rotary soil working or cultivating member 51 firmly but releasably secured to it with the aid of a splined hub that co-operates with splines on the downwardly projecting portion of the shaft 50 concerned and a retaining nut and washer, the nut being furnished with a transverse split pin or the like to prevent it becoming loosened during operation of the implement. Each hub is arranged at the center of a substantially horizontally disposed tine support 52 which has substantially vertically disposed sleeve-like tine holders at its opposite ends. The tine holders receive the fastening portions of rigid soil working tines 53 that have soil working portions which projects downwardly from the lowermost ends of the tine holders into the soil when the implement is in operation, the soil working portions of the tines 53 being inclined rearwardly from top to bottom by a few degress so as to trail with respect to the intended directions of rotation of the corresponding members 51 that are indicated by small arrows in FIG. 4 of the drawings. Each shaft 50 is provided, inside the hollow frame portion 49, with a corresponding straight-toothed or spurtoothed pinion 54, the pinions 54 being dimensioned and arranged in such a way that the teeth of each of them are in mesh with the teeth of the immediately neighbouring pinion, or the teeth of both of the immediately neighbouring pinions, in the single row of those pinions 54. Thus, rotation of one pinion 54 causes rotation of all of the other pinions in the alternately opposite directions that are indicated by the small arrows in FIG. 4 and this is, of course, also true for the shafts 50 and soil working or cultivating members 51 that correspond to the successive pinions 54.

The shaft 50 that corresponds to one of the center pair of soil working or cultivating members 51 of the row of twelve of those members has an upward extension through the top of the hollow frame portion 49 into a gear box 55 that is mounted immediately above the frame portion 49. Bevel pinions (not visible) within the gear box 55 place the shaft extension in driven connection with a substantially horizontal shaft (not visible) that is substantially parallel to the direction A. A second substantially horizontal shaft 57 that is also substantially parallel to the direction A lies vertically above the first mentioned substantially horizontal shaft in the gear box 55, its leading end projecting forwardly from the front of the gear box in substantially the direction A where it is splined or otherwise keyed to enable it to be placed in driven connection with the power take-off shaft of an agricultural tractor or other operating vehicle by an intermediate telescopic transmission shaft, that is of a construction which is known per se, having universal joints at its opposite ends. The rearmost end of the shaft 57 and the rearmost end of the underlying and parallel shaft both project through the back of the gear box 55 into a change-speed gear 56. It is not necessary to describe the construction of the change-speed gear 56 in any detail for the purposes of the present invention but, briefly, it comprises pairs of straight-toothed or spur-toothed pinions of different sizes whose splined hubs can co-operate exchangeably and interchangeably with the splined rear ends of the two shafts that project from the back of the gear box 55. The particular pair of pinions that is chosen, and its particular arrangement relative to the shafts, dictates the transmission ratio between the shaft 57 and the underlying shaft and thus the speed at which the soil working or cultivating members 51 will be driven in response to a substantially constant input speed of rotation applied to the leading end of the shaft 57.

The two shafts 50 that correspond to the two soil working or cultivating members 51 that are at the opposite ends of the single row thereof have short upward extensions through the top of the hollow frame portions 49, said extensions projecting into corresponding gear boxes 58. Each shaft extension is provided, inside the corresponding gear box 58, with a large bevel pinion 59 whose teeth are in driving mesh with those of a smaller bevel pinion 59A carried by a substantially horizontal shaft 60 that is rotatably mounted in the top of the gear box 58 concerned so as to extend parallel to the transverse length of the frame portion 49 and thus perpendicular or substantially perpendicular to the direction A. The axes of rotation of the two spaced shafts 60 are coincident and it will be seen from FIGS. 4 and 5 of the drawings that they are contained in a substantially vertical plane which also contains the axes of rotation of all twelve of the shafts 50. The opposite sides of each gear box 58 are provided with substantially vertical support plates 61 that extend substantially parallel to the direction A. The support plates 61 serve to fasten the gear boxes 58 to the top of the frame portion 49 and each of them has an upper edge that comprises upwardly convergent portions arranged to afford lateral protection to the gear box 58 concerned (see FIG. 5). The opposite ends of the hollow frame portion 49 are closed by substantially vertical side or end plates 62 that extend parallel to one another and substantially parallel to the direction A. Substantially horizontally aligned stub shafts 63 are provided close to the leading lower corners of the side plates 62 and each stub shaft 63 has a corresponding arm 64 turnable upwardly and downwardly thereabout alongside the corresponding side plate 62, said arms 64 being directed rearwardly with respect to the direction A from the stub shafts 63. Rear portions of the side plates 62 that project beyond the back of the frame portion 49 are formed with curved rows of holes 66 that are equidistant from the axis defined by the stub shafts 63 and each arm 64 is formed with at least one hole, at the same distance from said axis, which can be brought into register with any chosen one of the corresponding row of holes 66. Locking bolts 65 are provided for entry through the holes in the arms 64 and the chosen holes 66 to retain those arms firmly but releasably in chosen angular positions about the axis defined by the stub shafts 63. Rear portions of the arms 64 are interconnected by lower and upper tubular supports 67 and 68 and it will be evident that the angular positions that are chosen for the arms 64 dictate the horizontal levels of the supports 67 and 68 relative to the level of the frame portion 49. The two supports 67 and 68 extend substantially horizontally parallel to one another and to the transverse length of the frame portion 49, the lower tubular support 67 being a little further advanced with respect to the direction A, than is the upper tubular support 68 and thus being a little closer to the frame portion 49.

Each of the tubular supports 67 and 68 is provided with a plurality of rearwardly extending strip-shaped elongated elements 69, the lower edges of said elements 69 being convexly curved with each element 69 tapering gently from the corresponding support 67 or 68 towards the free rearmost end of that element. The elements 69 are arranged with their flat sides contained in planes that are substantially parallel to the direction A and it will be seen from FIG. 4 of the drawing that the elements 69 which are fastened to the support 67 alternate with those that are fastened to the support 68 across the working width of the implement, the spacing between the alternate elements 69 advantageously having a magnitude of substantially 3 centimeters and each element 69 having a length in the direction A which is not less than the distance between the two tines 53 of each soil working or cultivating member 51, this latter distance advantageously having a value of substantially 30 centimeters. The supports 67 and 68 and the elongated elements 69 together constitute a soil crumbling member that is generally indicated by the reference 70. Towards their opposite ends, the two tubular supports 67 and 68 are provided with corresponding arms 71 and 72 that project upwardly and forwardly therefrom with respect to the direction A. The upper leading ends of the arms 71 and 72 are pivotally connected to forked brackets at the rearmost ends of corresponding connecting rods 73 and 75, the leading ends of said connecting rods being fastened to rings forming parts of corresponding eccentrics 74 and 76. Further parts of the eccentrics 74 and 76 are in the form of dics fixedly but eccentrically secured to the opposite ends of the substantially horizontal shafts 60 that project from the opposite sides of the gear boxes 58 beyond the support plates 61. The discs of the two eccentrics 74 occupy corresponding angular positions about the axes of the two shafts 60 as regards their eccentricity, said positions being substantially 180° out of phase with the positions that are occupied by the discs of the two eccentrics 76 about the same coincident axes.

A coupling member or trestle 70A that is of substantially triangular configuration as seen in fron or rear elevation is fastened to the front of the hollow frame portion 49 midway across the width thereof and, in the use of the implement, is employed in connecting it to the three-point lifting device or hitch of an agricultutal tractor or other operating vehicle in the generally known manner that can be seen in outline in FIG. 4. The leading end of the input shaft 57 of the gear box 55 is placed in driven connection with the power take-off shaft of the same tractor or other operating vehicle by using the known telescopic transmission shaft having universal joints at its opposite ends that has been mentioned above and, before work commences, the change-speed gear 56 is adjusted having regard to the nature and condition of the soil that is to be worked and the degree of fineness that is required after the operation. In addition to performing its soil crumbling function, the member 70 bears against the ground surface and supports the implement therefrom. The level of the member 70 relative to the level of the frame portion 49 is dictated by the holes 66 that are chosen for co-operation with the bolts 65 and it will be realised that the chosen level is an important factor in determining the maximum depth of penetration of the tines 53 into the soil that is possible. Any necessary adjustment in this regard is carried out before work commences. As the implement of FIGS. 4 and 5 travels over soil that is to be cultivated thereby, the members 51 are driven from the power take-off shaft of the agricultural tractor or other operating vehicle and revolve in the directions indicated by the small arrows in FIG. 4. Since the distance between the two tines 53 of each member 51 is greater than is the distance between the axes of rotation of immediately neighbouring shafts 50, the individual strips of land that are worked by the members 51 overlap one another to produce, in effect, a single broad strip of worked soil that, in this particular example, has a width of substantially 3 meters. The transmission to the shafts 50 also drives the shafts 60 in the gear boxes 58 and the rotation of said shafts 60 causes the tubular supports 67 and 68, which are pivotally connected to the arms 64 at their opposite ends, to rock or oscillate rapidly about their own longitudinal axes so that the elongate elements 69 of the soil crumbling member 70 will vibrate rapidly upwards and downwards, the elements 69 that correspond to the support 67 moving upwardly while those that correspond to the support 68 move downwardly and vice versa. This is due to the fact that the discs of the eccentrics 74 and 76 are substantially 180° out of phase with one another.

The soil crumbling member 70 acts upon the soil already broken up by the immediately foregoing members 51 and produces an intensive crumbling and levelling action so that, usually in a single traverse, the implement can form a substantially flat, well crumbled and homogeneous seed bed. In the embodiment of FIGS. 4 and 5 of the drawings, the shafts 60 form parts of a drive transmission between the gear box 55 and the soil crumbling 70 and have parts of the eccentrics 74 and 76 secured to them. However, it is noted that, if desired, the soil crumbling member 70 could readily be removed from the remainder of the implement after which one or both of the shafts 60 could be employed in driving one or more rotary input shafts of one or more other tools or implements to be used in combination with the soil cultivating implement.

Figure 6:
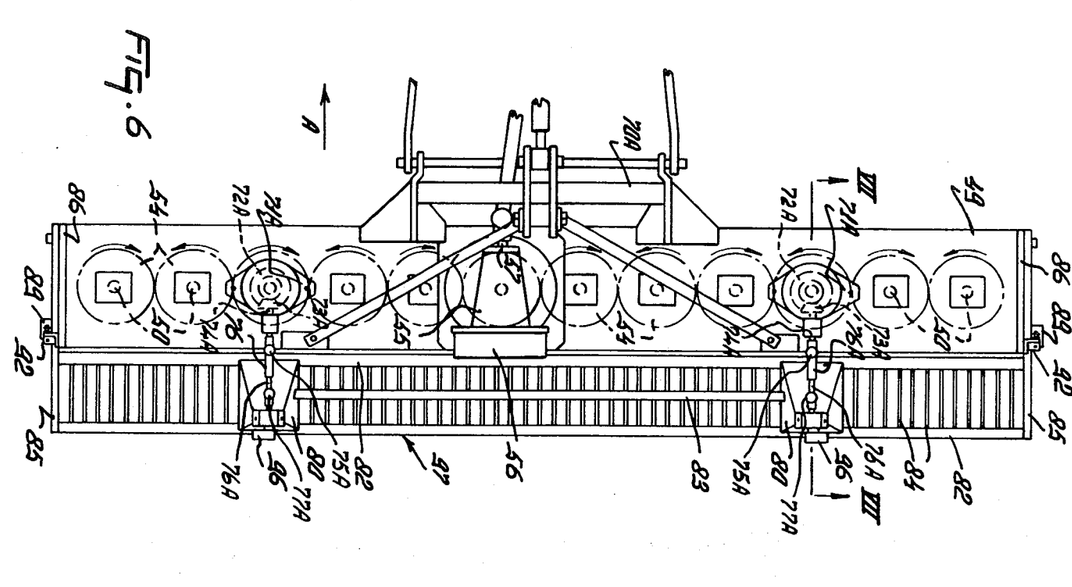
FIG. 6 is a plan view illustrating a third form of soil cultivating implement in accordance with the invention connected to the rear of an agricultural tractor.
Figure 7:
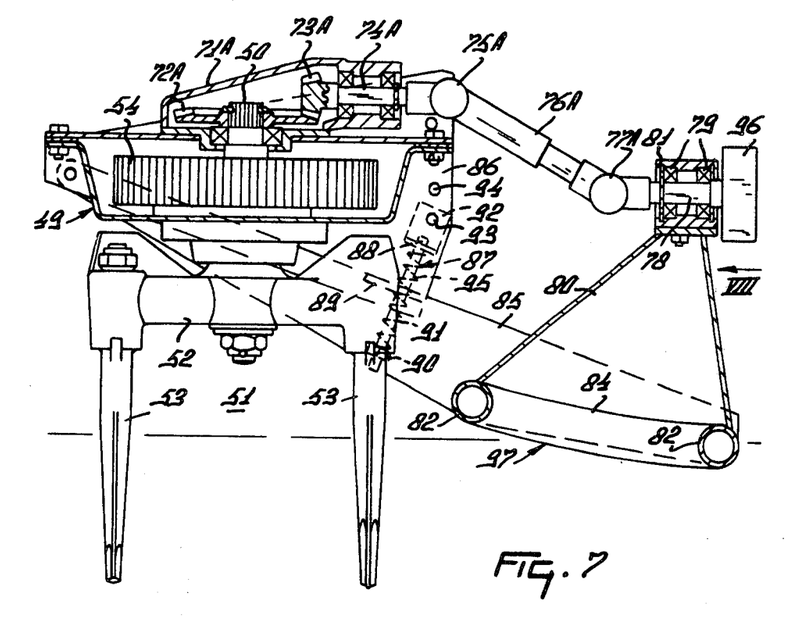
FIG. 7 is a section, to an enlarged scale, taken on the line VII—VII in FIG. 6.
Figure 8:
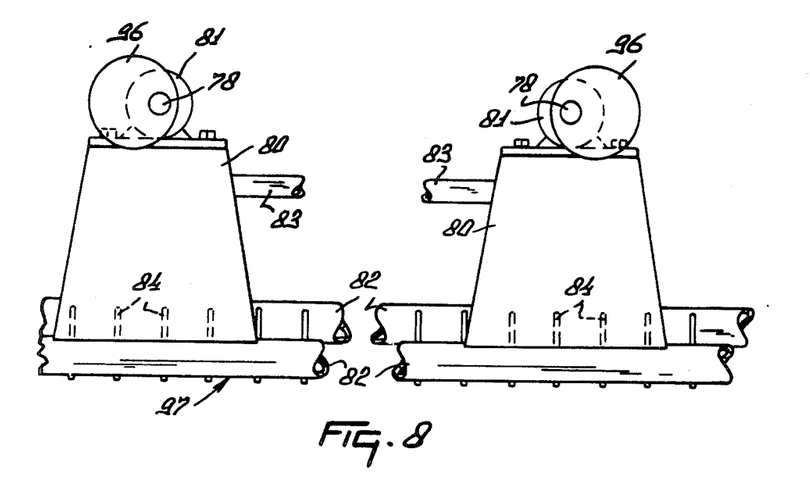
FIG. 8 is a rear elevation of some parts of the implement of FIGS. 6 and 7 as seen in the direction indicated by an arrow VIII in FIG. 7.

FIGS. 6 to 8 of the drawings illustrate a soil cultivating implement that is similar in many respects to the implement that has already been described with reference to FIGS. 4 and 5 and, accordingly, parts that are similar, or identical, to previously described parts are indicated in FIGS. 6 to 8 of the drawings by the same references as have been employed in the earlier Figures. In the embodiment of FIGS. 6 to 8 of the drawings, those two shafts 50 which are the third shafts along the row thereof counting from its opposite ends have short upward extensions through the top of the hollow frame portion 49 into corresponding gear boxes 71A. Each such shaft extension carries, inside the corresponding gear box 71A, a large bevel pinion 72A whose teeth are in driving mesh with a smaller bevel pinion 73A secured to, or integral with, the leading end of a corresponding substantially horizontal shaft 74A that extends substantially parallel to the direction A. The rearmost end of each shaft 74A projects from the back of the corresponding gear box 71A and is there connected by a universal joint 75A to one end of a telescopic transmission shaft 76A. The opposite and rear end of the telescopic transmission shaft 76A is connected by a further universal joint 77A to the leading end of a substantially horizontal shaft 78 that extends substantially parallel to the direction A. The shaft 78 is rotatably mounted in a pair of substantially horizontal bearings 79 carried by a cylindrical housing 81 that is secured to the top of a corresponding support 80.

Each of the two supports 80 has the shape of an irregular trucated pyramid (see FIG. 6), the facing sides of the two supports 80 being rigidly interconnected by a tubular tie rod 83 that is substantially horizontally parallel to the hollow frame portion 49 and thus substantially perpendicular to the direction A. The bottoms of the two supports 80 are interconnected by two tubular supports 82 that are parallel to the tie rod 83 and in spaced apart relationship in the direction A. As will be evident from FIG. 6 of the drawings, the tubular supports 82 actually extend outwardly beyond the two supports 80 and throughout the working width of the members 51. The tubular supports 82 are interconnected at regular intervals, throughout substantially the whole of their lengths, by a plurality of strip-shaped elongated elements 84 whose general planes are substantially vertically disposed in substantially parallel relationship with the direction A, the lowermost edge of each element 84 having a slight convex curvature in a downward direction. It is preferred, but is not absolutely essential, that the elements 84 should be regularly spaced apart from one another by distances of substantially 3 centimeters.

The opposite ends of the tubular supports 82 are secured to rear portions of arms 85 which arms extend forwardly and upwardly from the tubular supports 82 to have their upper leading ends pivotally connected to front portions of side or end plates 86 of the hollow frame portion 49 by the substantially horizontally aligned stub shafts 63. The side plates 86 are substantially sector-shaped and, apart from their particular shape, are equivalent to the previously described side or end plates 64.

A spring mechanism that is generally indicated by the reference 87 is connected to each of the two arms 85 substantially midway along the length of that arm and comprises a rod 88 axially slidable through a hole in a guide plate 89 projecting perpendicularly from the upper edge of the corresponding arms 85. The lower end of each rod 88 carries an axially adjustable nut 90 and it will be seen from FIG. 7 of the drawings that each rod 85 is surrounded, between the corresponding guide plate 89 and nut 90, by a helical compression spring 91. The uppermost end of each rod 88 is connected to one limb of a corresponding right-angled support 92 whose other limb is coupled to the neighbouring side plate 86 by a pivot bolt or the like 93 in a positionally adjustable manner. A plurality of holes 94 are formed in each side plate 86 at different levels close to the rearmost edge of that side plate and the pivot bolts or the like 93 can be entered through any chosen holes 94 to connect the right-angled supports 92 to said side plates 86 at the corresponding levels. A second helical compression spring 95 surrounds the upper part of each rod 88 between the upper surface of the corresponding guide plate 89 and the lower surface of the non-vertical limb of the corresponding support 92.

The ends of the shafts 78 that project behind the bearing housings 81 have corresponding weights 96 eccentrically secured to them. The two eccentric weights 96 are fastened to the shafts 78 with a phase difference of 180° between them as regards their eccentricity and, since the shafts 78 will revolve in opposite directions when the implement is in use, the result is that substantially only vibratory movement of the elements 84 in substantially vertical directions is caused, movement in a substantially horizontal lateral direction (with respect to the direction A) that would tend to be caused by the motion of one of the two eccentric weights 96 being substantially wholly cancelled out by the opposing effect of the other eccentric weight 96.

In the use of the implement of FIGS. 6 to 8 of the drawings, its coupling member or trestle 70A is connected to the three-point lifting device or hitch of an agricultural tractor or other operating vehicle and the input shaft 57 of the gear box 55 is placed in driven connection with the power take-off shaft of the same tractor or other vehicle by the known telescopic transmission shaft that has been discussed above. In this embodiment, the strip-shaped elongate elements 84 and their supports 82 together afford a soil crumbling member that is generally indicated by the reference 97, said member 97 being rapidly vibrated in an upward and downward direction as a result of the fast rotation of the eccentric weights 96 in opposite directions. The arms 85 to which the opposite ends of the soil crumbling member 97 are connected can turn upwardly and downwardly about the axis defined by the stub shafts 63 against the action of the opposed compression springs 91 and 95 of the spring mechanisms 87 which mechanisms 87 tend, it will be realised, to maintain the arms 85 in an equilibrium position corresponding to one particular angular setting about the axis defined by the stub shafts 63 for each possible level of the pivot bolts or the like 93 relative to the side plates 86. The rapid upward and downward vibratory movement of the soil crumbling member 97 crumbles and levels the lumps of soil that are produced by the immediately foregoing tines 53 of the members 51 and the implement can usually produce a substantially flat, well crumbled and homogeneous bed that is ready for the sowing of seeds in a single traverse of the soil. As in the previous embodiment, the soil crumbling member 97 also serves the additional function of a supporting member of the implement since it will be realised that its level relative to that of the hollow frame portion 49 is dictated principally by the particular holes 94 that are chosen for co-operation with the pivot bolts or the like 93 and that the chosen level governs the maximum depth of penetration of the tines 53 into the soil which is possible. If desired, the shafts 78 may be extended further rearwardly and one or both of their rearward extensions may be used to drive moving parts of at least one further tool or implement that is to be used in combination with the soil cultivating implement.

Although certain features of the soil cultivating implements that have been described and/or that are illustrated in the accompanying drawings will be set forth in the following claims as inventive features, it is emphasised that the invention is not necessarily limited to those features and that it includes within its scope each of the parts of each soil cultivating implement that has been described, and/or that is illustrated in the accompanying drawings, both individually and in various combinations.

What we claim is:

1. A soil cultivating implement comprising a frame and a row of soil working rotors supported on a portion of said frame, said rotors being mounted on corresponding upwardly extending shafts and driving means connected to rotate said rotors about axes defined by said shafts, soil crumbling means interconnected to said frame and positoned to the rear of said rotors, said crumbling means comprising a plurality of elongated soil contacting elements on respective supports and said elements extending substantially horizontally to the rear of said supports, said driving means comprising eccentric transmissions that are connected to said supports and said elements being pivoted up and down by said driving means via said transmissions and displaced in relative opposite directions to perform reciprocatory and/or vibratory movements against the soil previously worked by said cultivating means during operation, said supports being held between arms that are pivotably connected to said frame, two of said supports being pivoted to said arms at different horizontal levels and one in front of the other with respect to the direction of travel, setting means retaining said arms in chosen angular positions about the axes of the pivotal connection of said arms to said frame.

2. An implement as claimed in claim 1, wherein said eccentric transmission includes a horizontal shaft at each side of said frame portion and each shaft extends transverse to the direction of travel, the opposite ends of said horizontal shaft projecting from a corresponding gear box and said ends have eccentrics, said eccentrics being substantially 180° out of phase with one another around the axis of rotation of the horizontal shaft with respect to their eccentricity.

3. An implement as claimed in claim 2, wherein each eccentric comprises an outer part which is pivotally connected to a support for a corresponding group of said elements.

4. An implement as claimed in claim 1, wherein said crumbling member extends throughout the working width of said row of rotors.

5. An implement as claimed in claim 1, wherein said elements are strip-shaped, said elements extending in the general direction of travel.

6. An implement as claimed in claim 5, wherein the elements of one group are arranged alternately between those of the second group.

7. An implement as claimed in claim 5, wherein lower edges of the said elements are of downwardly convex configuration.

8. An implement as claimed in claim 5, wherein said elements are supported adjacent their leading ends with respect to the direction of travel and extend freely rearwardly therefrom, without further support.

9. An implement as claimed in claim 8, wherein said elements taper towards their free and rearmost ends.

10. An implement as claimed in claim 1, wherein each support is independently pivoted to said arms and one support is connected to the arms by pivots located at a higher level than further pivots that connect the other support to those arms.

11. An implement as claimed in claim 1, wherein said transmission means includes spaced apart rotary eccentrics for respective supports and said eccentrics being connected to a substantially horizontal driving shaft of said driving means, said eccentrics being mounted, relative to their axes of rotation, with a phase difference of about 180° relative to their eccentricity.

12. An implement as claimed in claim 11 wherein said rotors are mounted on corresponding upwardly extending shafts which define the axes of rotation of said rotors, and said driving shaft is connected to one of said shafts.

13. A soil cultivating implement comprising a frame and a row of soil working rotors supported on a portion of said frame, soil crumbling means interconnected to said frame and positioned to the rear of said rotors, said crumbling means comprising a plurality of elongated, strip-shaped soil contacting elements that extend substantially horizontally in the direction of travel and driving means comprising eccentric transmission means being connected to said crumbling means, said elements being displaceable by said driving means via said transmission means with respect to said frame in a non-horizontal direction to perform reciprocatory and/or vibratory movements against soil previously worked by said cultivating means during operation, said elements being mounted on support means comprising two elongated, transversely extending supports and each support having corresponding groups of elements connected thereto, said two supports being located at different working positions; one before the other with respect to the direction of travel, adjusting means including pivoted arms interconnecting said supports with said frame portion and said arms being settable in chosen angular positions about at least one pivot with respect to said frame portion to vary the working level of said elements.

* * * * *